United States Patent [19]
Nomura et al.

[11] Patent Number: 6,008,955
[45] Date of Patent: Dec. 28, 1999

[54] OPTICAL LENS

[75] Inventors: Yoshimitsu Nomura; Masaaki Fukuda; Takashi Ito; Kaneyoshi Yagi, all of Saitama, Japan

[73] Assignee: Fuji Photo Optical Co., Ltd., Saitama, Japan

[21] Appl. No.: 09/161,743

[22] Filed: Sep. 29, 1998

[30] Foreign Application Priority Data

Oct. 8, 1997 [JP] Japan ................................ 9-276038

[51] Int. Cl.⁶ ......................... G02B 3/02; G02B 13/18
[52] U.S. Cl. ......................... 359/719; 359/718; 359/642
[58] Field of Search .................................. 359/718, 719, 359/709, 710, 642

[56] References Cited

U.S. PATENT DOCUMENTS

| | | | |
|---|---|---|---|
| 3,598,477 | 8/1971 | Levin | 359/718 |
| 3,743,385 | 7/1973 | Schaefer | 359/718 |
| 4,678,288 | 7/1987 | Lonsdale et al. | 359/719 |
| 5,384,659 | 1/1995 | Shikama et al. | 359/719 |
| 5,450,244 | 9/1995 | Fantone | 359/719 |
| 5,665,957 | 9/1997 | Lee et al. | 359/719 |
| 5,805,355 | 9/1998 | Natsuno | 359/719 |
| 5,905,599 | 5/1999 | Nomura et al. | 359/819 |

Primary Examiner—Georgia Epps
Assistant Examiner—Evelyn A. Lester
Attorney, Agent, or Firm—Leydig, Voit & Mayer

[57] ABSTRACT

An optical lens made of plastic includes an optically functioning part, a flange part and disposed around the optically functioning part. The flange part has an outer circumferential face having a cylindrical surface about a lens optical axis. A gate-removed part is located at the outer circumferential face as an outward-projecting quadratic surface. The gate-removed part is located between a virtual outer circumferential face and a plane passing through a tolerance limit on the lens optical axis side. The virtual outer circumferential face is defined when a residual gate part is cut along a cylindrical surface coaxial with the lens optical axis and having a radius identical to that of the outer circumferential face. The plane is set on the lens optical axis side when the residual gate part is removed by cutting the flange part.

4 Claims, 4 Drawing Sheets

OPTICAL LENS

BACKGROUND OF THE INVENTION

1. Field of the Invention

The present invention relates to an optical lens made of plastic, which is usable in a variety of products ranging from objective lenses of CD-ROM drives or the like to large-aperture lenses for CRT or the like.

2. Related Background Art

Optical lenses made of plastic, such as the one shown in FIGS. 5 and 6, have conventionally been known and widely used for eyepieces of 8-mm video cameras, objective lenses of CD-ROM drives, and the like. The optical lens 101 of FIGS. 5 and 6 is made by injection molding, transfer molding, or the like. For making the optical lens 101, a molten resin such as PMMA (polymethyl methacrylate) is caused to flow into a cavity from a gate. Then, the resin is solidified by cooling. After the resin is solidified, the part of resin solidified within the gate orifice and pulled out of the die, or both the gate orifice and the part of resin solidified within the gate orifice (hereinafter referred to as "residual gate part" collectively) are removed. After surface treatment carried out as required, the optical lens 101 is completed.

For processing the above-mentioned residual gate part, it will essentially be ideal if the residual gate part 110 is removed alone from the optical lens 101 by moving a cutting tool such as end mill along the outer circumferential face 104 of the optical lens 101. In general, however, in view of the processing accuracy of the processing machine, reduction in manufacturing cost, and the like, a part of the outer circumferential part (flange part 106) of the optical lens 101 is cut flat as shown in FIG. 5, thereby removing the residual gate part 110. Consequently, the outer circumferential face 104 of the optical lens 101 completed as a product includes a flat, gate-removed part 105 which is defined when the residual gate part 110 is removed.

On the other hand, in general, an optical lens made of plastic absorbs moisture (water) existing in the air, due to the hygroscopicity inherent in the plastic material. Also, it is known that the moisture is absorbed into the optical lens 101 radially from the outer circumferential face 104 of the optical lens 101 toward the optical axis (a) thereof.

SUMMARY OF THE INVENTION

It is an object of the present invention to provide an optical lens which exhibits stable optical performances with a uniform refractive index.

The optical lens in accordance with the present invention is an optical lens made of plastic. This optical lens comprises an optically functioning part, a flange part formed around the optically functioning part, and a gate-removed part formed at the outer circumferential face. The flange part has an outer circumferential face formed as a cylindrical surface about a lens optical axis. The gate-removed part is defined by removing a residual gate part projecting from the outer circumferential face and is formed as an outward-projecting quadratic surface. The gate-removed part is located between a virtual outer circumferential face and a plane passing through a tolerance limit on the lens optical axis side set when the residual gate part is removed by flatly cutting the flange part. The virtual outer circumferential face is defined when the residual gate part is cut along a cylindrical surface which is formed about the lens optical axis and has a radius identical to that of the outer circumferential face.

In the conventional optical lens 101, as shown in FIG. 5, the residual gate part 110 is cut together with the outer circumferential part (flange part 106) of the optical lens 101, whereby the flat, gate-removed part 105 is formed at the outer circumferential face 104. The gate-removed part 105 is located on the lens optical axis (a) side of the original outer circumferential face 104 of the optical lens 101, which is a cylindrical surface, for example. As a consequence, the outer circumferential face 104 of the optical lens 101 as a whole including the gate-removed part 105 would not be symmetrical about the lens optical axis (a). Namely, within a plane passing through the gate-removed part 105 and including the optical axis (a) of the optical lens 101, as shown in FIG. 6, the distance (r1) from the gate-removed part 105 to the optically functioning part 102 through which light is effectively transmitted becomes shorter than the distance (r2) from the outer circumferential face 104 other than the gate-removed part 105 to the optically functioning part 102.

When the optical lens 101 absorbs moisture (water) in the air in this state, the moisture absorbed into the optical lens 101 from the outer circumferential face 104 other than the gate-removed part 105 would hardly reach the optically functioning part 102. Since the distance from the gate-removed part 105 to the optically functioning part 102 is shorter, by contrast, the moisture absorbed into the lens from the surface of the gate-removed part 105 would permeate into the optically functioning part 102 in a relatively short time (rapidly). Consequently, at the part of optically functioning part 102 near the gate-removed part 105, density would change due to the moisture absorbed into the optical lens 101, thereby increasing the refractive index. As a result, the refractive index in the optically functioning part 102 in the optical lens 101 as a whole may fail to become uniform. When the refractive index of the optically functioning part 102 is thus not uniform, it may affect aberration, thereby failing to yield expected optical performances. In particular, this phenomenon would occur remarkably in PMMA (polymethyl methacrylate) which is widely used as a material for optical lenses.

In the optical lens in accordance with the present invention, by contrast, the gate-removed part is formed as a quadratic surface, such as cylindrical surface, elliptic cylindrical surface, or conical surface, which projects outward (toward the side where the residual gate part existed). Let a plane passing through a tolerance limit on the lens optical axis side set when removing the residual gate part by flatly cutting the flange part be a first plane. Also, let a plane including the lens optical axis and the center line of the residual gate part be a second plane. Then, a boundary line between the outer circumferential face of the optical lens and the gate-removed part is located between a line of intersection between the outer circumferential face of the optical lens and the first plane, and a line of intersection between the virtual outer circumferential face and the residual gate part. Also, a line of intersection between the gate-removed part and the second plane is located between a line of intersection between the virtual outer circumferential face (residual gate part) and the second plane, and a line of intersection between the first and second planes. Consequently, as compared with the case where the residual gate part is removed by flatly cutting the flange part, the shortest distance between the gate-removed part and the lens optical axis can be made longer more easily.

As a result, when compared with an optical lens having a flat gate-removed part, the moisture absorbed into the lens from the gate-removed part is restrained from reaching the optically functioning part. Hence, density can be prevented from changing in the optically functioning part due to the moisture absorbed into the lens from the gate-removed part, whereby the refractive index of the optical lens can be kept uniform.

Preferably, in this case, the gate-removed part is formed like a cylindrical or conical surface. Preferably, the plastic is a polymethyl methacrylate resin.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

In the following, preferred embodiments of the optical lens in accordance with the present invention will be explained in detail with reference to the accompanying drawings.

Figure 1:
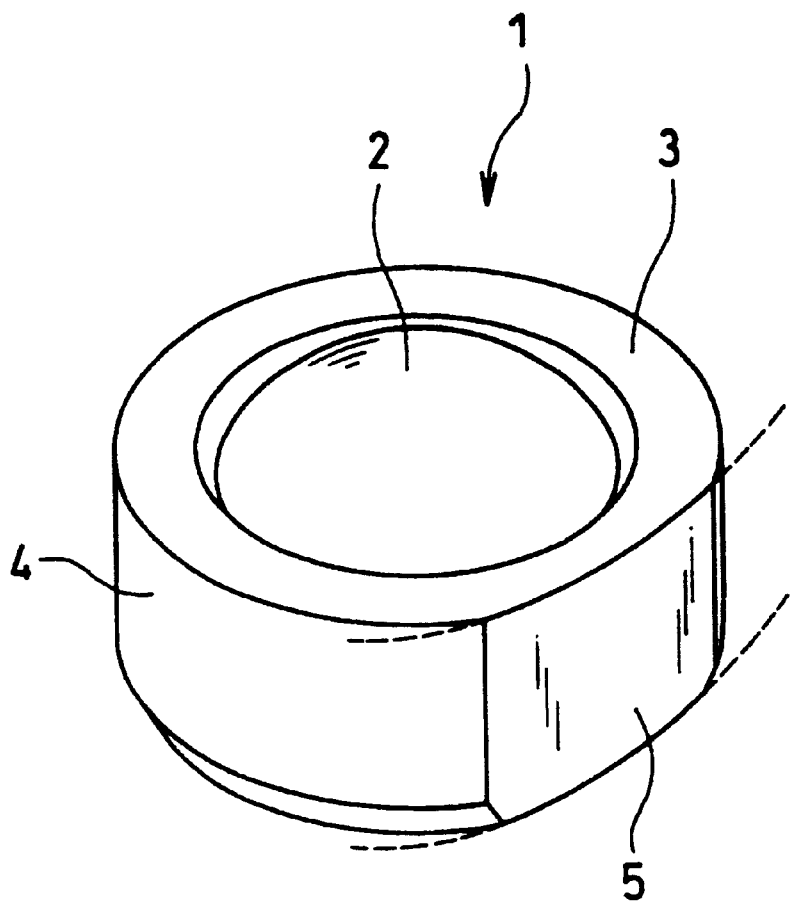
FIG. 1 is a perspective view showing an optical lens in accordance with the present invention.

FIG. 1 is a perspective view showing an optical lens in accordance with the present invention. The optical lens 1 shown in FIG. 1 is manufactured, for example, by injection molding, transfer molding, or the like using a plastic resin such as PMMA (polymethyl methacrylate), polystyrene, polycarbonate, amorphous polyolefin, or the like, and thus can be made inexpensively. The optical lens 1 has a diameter of about 3 to 8 mm, for example. It can also be formed as a large-aperture lens having a diameter of about 100 mm to 150 mm, employed in CRT or the like.

Disposed at the center part of the optical lens 1 is an optically functioning part 2 adapted to function as a convex lens, through which light is effectively transmitted. Around the optically functioning part 2, a flange part 3 is formed. The upper and lower faces of the flange part 3 are made flat, thereby functioning as reference surfaces when the optical lens 1 is mounted on a lens holder section (not shown) incorporated in an optical instrument such as 8-mm video camera or CD-ROM drive.

Figure 2:
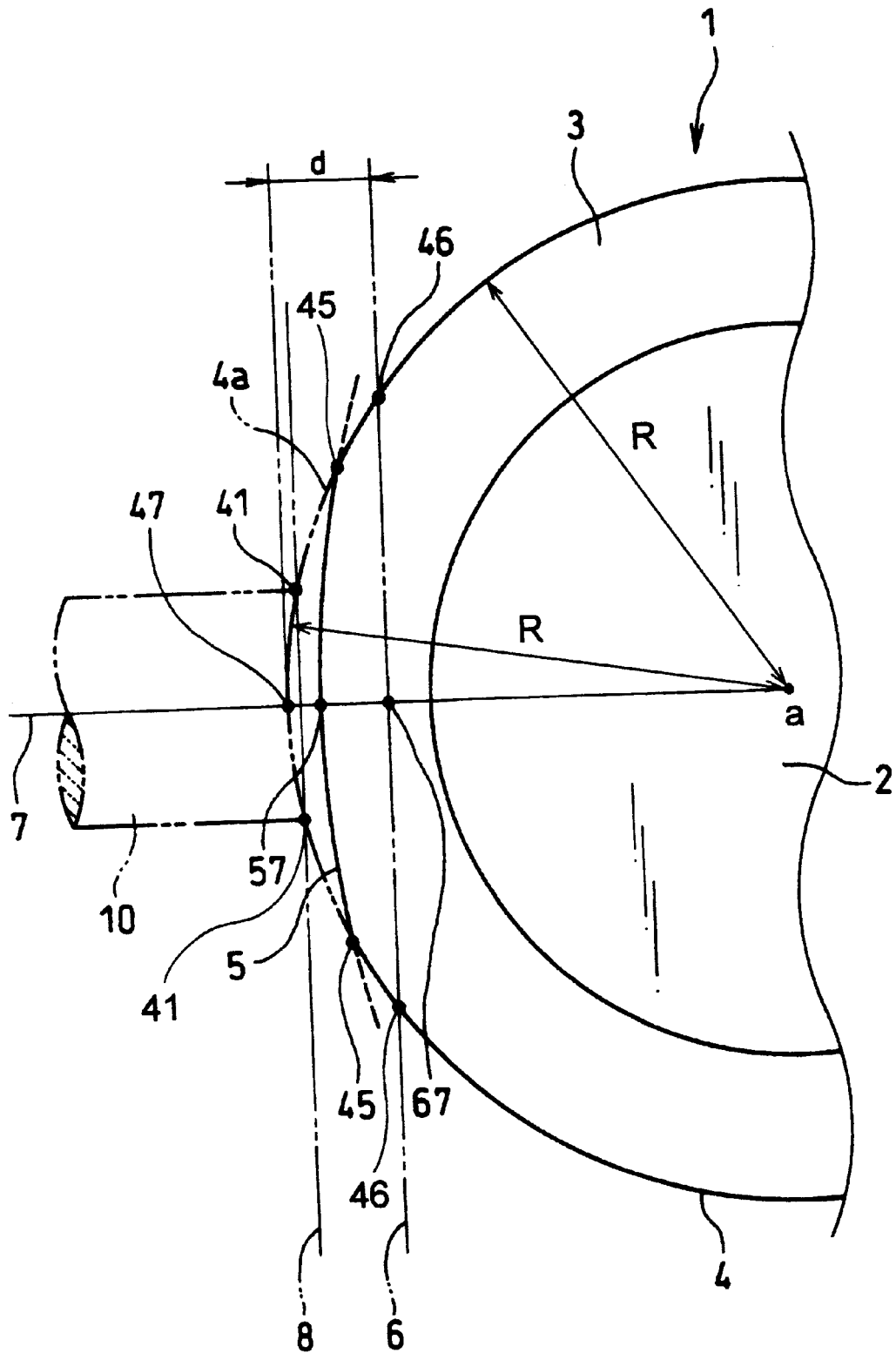
FIG. 2 is a plan view showing the optical lens of FIG. 1.

As shown in FIGS. 1 and 2, the outer circumferential face 4 of the flange part 3 is formed as a cylindrical surface. A part of the outer circumferential face 4 includes a gate-removed part 5 which is formed as a quadratic surface projecting outward (toward the side where the residual gate part existed, see FIG. 2). Here, the quadratic surface refers to both complete quadratic surface and approximate quadratic surface. The approximate quadratic surface refers to a set of minute planes formed by appropriately changing the moving direction of a linearly-moving cutting tool. Such a set of minute planes is practical in view of the accuracy in the processing machine and the fact that it is practically difficult to form the gate-removed part 5 as a complete quadratic surface. Without being restricted to a cylindrical surface, the gate-removed part 5 may also be formed as a quadratic surface such as elliptic cylindrical surface or conical surface.

The gate-removed part 5 is defined by removing the residual gate part 10 projecting from the outer circumferential face 4 in order that so-called burrs may not project from the outer circumferential face 4 of the optical lens 1. The residual gate part 10 is formed upon injection molding or the like and indicates the part of resin solidified within the gate orifice and pulled out of the die, or both the gate and the part of resin solidified within the gate orifice (see FIGS. 2 and 3). In this optical lens 1, the gate-removed part 5 is formed as a cylindrical surface whose radius of curvature is greater than the radius R of the optical lens 1, with its center line of curvature located on the lens optical axis (a) side.

Figure 3:
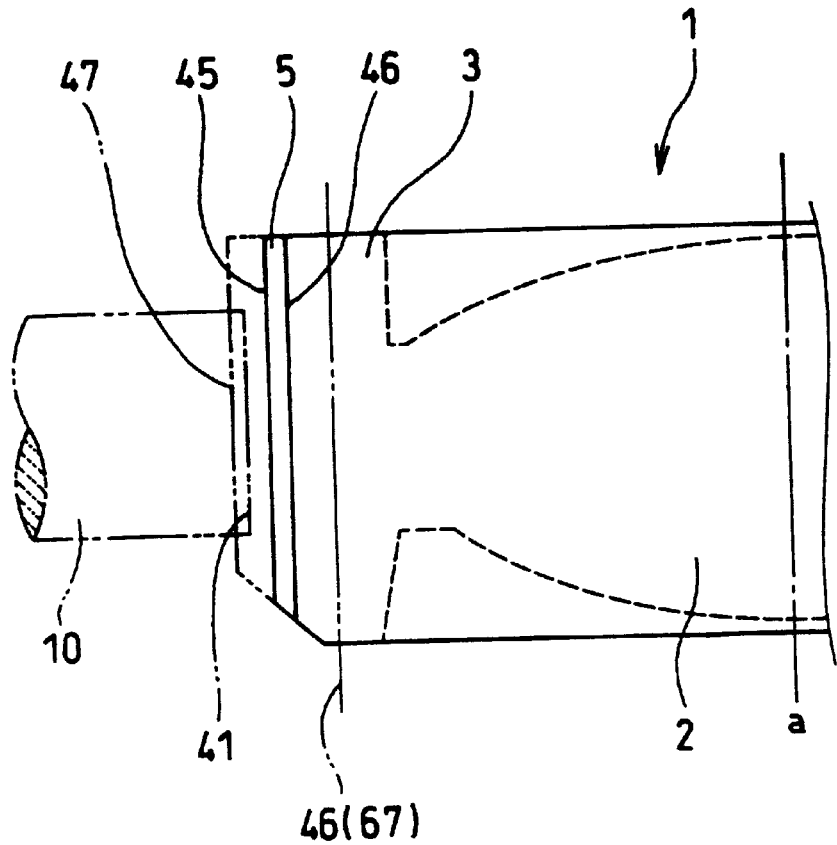
FIG. 3 is a side view showing the optical lens of FIG. 1.

In order to form the gate-removed part 5 by removing the residual gate part 10 from the optical lens 1, a cutting tool such as end mill is used. The cutting tool is moved, like an arc, by a NC processing machine or the like. As shown in FIGS. 2 and 3, the cutting tool cuts the part being defined between a virtual outer circumferential face 4a and a first plane 6 like a quadratic surface (cylindrical surface).

Here, as with the outer circumferential face 4 of the optical lens 1, the virtual outer circumferential face 4a is a cylindrical surface having a radius R formed around the lens optical axis (a). Namely, the virtual outer circumferential face 4a refers to an ideal curved surface defined when the residual gate part 10 is removed alone from the optical lens 1.

On the other hand, the first plane 6 is a plane passing through a tolerance limit on the lens optical axis (a) set when the residual gate part 10 is removed by flatly cutting the flange part 3. Namely, when the gate-removed part is made flat, an optical lens whose gate-removed part is located on the lens optical axis (a) side of the first plane 6 would be treated as a defective item. The tolerance limit is defined by appropriately setting the distance (d) between the virtual outer circumferential face 4a and the first plane 6 on a second plane 7. The second plane 7 is a plane including the lens optical axis (a) and the center line of the residual gate part 10 (see FIG. 2). In the optical lens 1 having an outside diameter of 3 to 8 mm, the distance (d) is typically 0.3 to 1.0 mm, though depending on the width of the residual gate part 10. On the other hand, in the optical lens having an outside diameter of 100 to 150 mm, the distance (d) is typically 1.0 to 6.0 mm.

When the gate-removed part 5 is thus defined, boundary lines 45 between the outer circumferential face 4 and the gate-removed part 5 are located between an intersecting line 46 and an intersecting line 41. The intersecting line 46 is a line of intersection between the outer circumferential face 4 and the first plane 6. The intersecting line 41 is a line of intersection between the virtual outer circumferential face 4a and the residual gate part 10. On the other hand, an intersecting line 57 between the gate-removed part 5 and the second plane 7 is located between an intersecting line 47 and an intersecting line 67. The intersecting line 47 is a line of intersection between the virtual outer circumferential face 4a (residual gate part 10) and the second plane 7. The intersecting line 67 is a line of intersection between the first plane 6 and the second plane 7. Hence, the surface of the gate-removed part 5 is positioned on the lens optical axis (a)

side of the original outer circumferential face 4 (virtual outer circumferential face 4a) of the optical lens 1, or is positioned on the same surface as the outer circumferential face 4. As a consequence, so-called burrs would not project from the outer circumferential face 4 of the optical lens 1.

When the residual gate part 10 is removed by flatly cutting the flange part 3, by contrast, the tolerance limit on the residual gate part 10 side (outside) is a third plane 8. The third plane passes through the intersecting line 41 and is orthogonal to the second plane 7 (center line of the residual gate part 10). An optical lens whose gate-removed part is located outside the third plane 8 (the residual gate part 10 side) would be treated as a defective item since burrs are likely to project from the outer circumferential face 4 of the optical lens.

Now will be considered is a case where the gate-removed part 5 is defined by cutting off, like a quadratic surface, the part between the first plane 6 and the third plane 8.

In this case, when the gate-removed part 5 is located closest to the lens optical axis (a), the boundary lines 45 between the gate-removed part 5 and the outer circumferential face 4 coincide with the intersecting lines 46 between the outer circumferential face 4 and the first plane 6. Since the gate-removed part 5 of the optical lens 1 is a quadratic surface (cylindrical surface) projecting outward, the intersecting line 57 between the gate-removed part 5 and the second plane 7 would be located outside the line of intersection 67 between the first plane 6 and second plane 7. When the gate-removed part 5 is located most outside (on the residual gate part 10 side), the boundary lines 45 between the gate-removed part 5 and the outer circumferential face 4 coincide with the intersecting line 41 between the virtual outer circumferential face 4a and the residual gate part 10. Since the gate-removed part 5 is a quadratic surface (cylindrical surface) projecting outward, the intersecting line 57 between the gate-removed part 5 and the second plane 7 is located outside a line of intersection between the third plane 8 and second plane 7.

Consequently, as compared with the case where the residual gate part 10 is removed by flatly cutting the flange part 3, the shortest distance between the gate-removed part 5 and the lens optical axis (a) as a whole can be made longer in the optical lens 1 as a product.

Hence, the permeation time (speed) of the moisture absorbed into the optical lens 1 from the outer circumferential face 4 and the gate-removed part 5 can be made substantially the same throughout the outer periphery. Therefore, the moisture absorbed into the optical lens 1 from the gate-removed part 5 can be prevented from permeating into the optically functioning part 2. As a result, the density in the optically functioning part 2 can be prevented from changing due to the moisture which is absorbed from the gate-removed part 5 into the optical lens 1 and reaches the optically functioning part 2. Accordingly, the refractive index of the optical lens 1 can be made uniform. Hence, it is possible to realize an optical lens which can be made easily and inexpensively and yields stable optical performances with a uniform refractive index.

Figure 4:
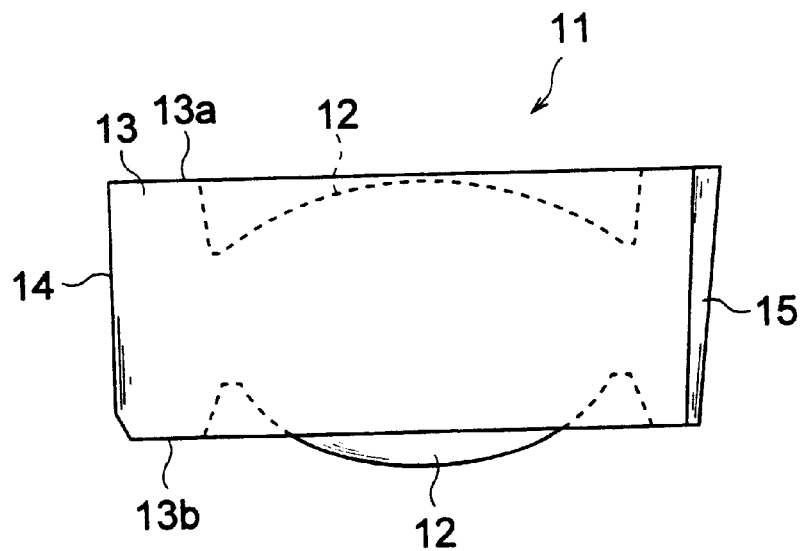
FIG. 4 is a side view showing another embodiment of the optical lens in accordance with the present invention.
Figure 5:
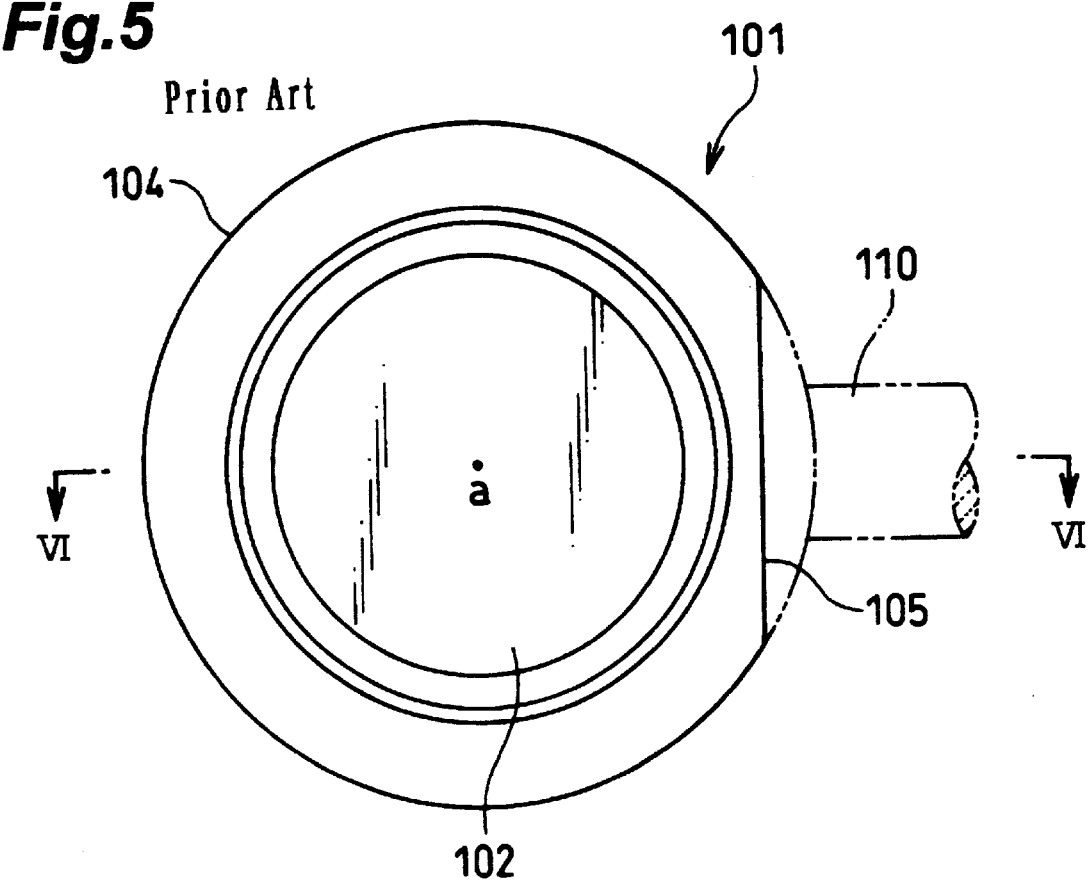
FIG. 5 is a plan view showing a conventional optical lens.
Figure 6:
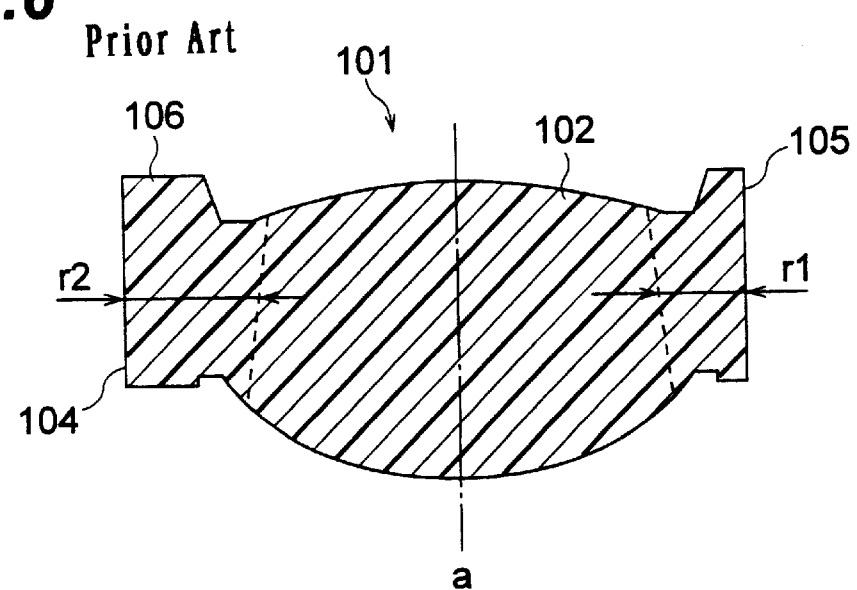
FIG. 6 is a sectional view taken along the line V—V in FIG. 5.

FIG. 4 is a side view showing another embodiment of the optical lens in accordance with the present invention. Disposed at the center part of the optical lens 11 shown in FIG. 4 is an optically functioning part 12 adapted to function as a convex lens, through which light is effectively transmitted. Around the optically functioning part 12, a flange part 13 is formed. The upper face 13a and lower face 13b of the flange part 13 are made flat, and would function as reference surfaces when the optical lens 11 is mounted on a lens holder section (not shown). The outer circumferential face 14 of the optical lens 11 is formed as a cylindrical surface. A gate-removed part 15 is formed at the outer circumferential face 14 as a conical face projecting outward. In order to form the gate-removed part 15 by removing the residual gate part from the optical lens 1, a cutting tool such as end mill is used. The cutting tool is moved in a slightly tilted state, like an arc, by a NC processing machine or the like. The cutting tool cuts a part of the flange part 13 together with the residual gate part.

When the gate-removed part 15 is thus formed as a conical surface, quite favorable results can be obtained in practice. In the vicinity of the gate-removed part 15 of the optical lens 11, molecular orientation may be biased under the influence of resin flows at the time of molding. Optical distortion is likely to occur in the part where the molecular orientation is biased. Therefore, in a lens holder section incorporated in an optical instrument such as CD-ROM drive, the position of the gate-removed part is preset in view of the direction of polarization of light. Here, since the gate-removed part 15 is formed as a conical surface, the gate-removed part 15 becomes an oblique, curved surface. As a result, the gate-removed part 15 is clearly distinguished from the other outer circumferential face 14. For example, when the gate-removed part 15 is detected by a photosensor or the like, the direction of light reflected by the gate-removed part 15 greatly differs from the direction of light reflected by the other outer circumferential surface 14. Consequently, when placing the gate-removed part 15 at a predetermined position in the lens holder section, it can be detected quite easily.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical lens comprising:
   an optically functioning part made of plastic;
   a flange part disposed around said optically functioning part and having an outer circumferential face with a cylindrical surface coaxial with an optical axis of said lens; and
   a gate-removed part located at said outer circumferential face as an outward-projecting quadratic surface, wherein said gate-removed part is located between a virtual outer circumferential face defined when a residual gate part is cut along a cylindrical surface coaxial with the optical axis of said lens and having a radius identical to that of said outer circumferential face, and a plane passing through a tolerance limit on the lens optical axis side, set when said residual gate part is removed by cutting said flange part.

2. The optical lens according to claim 1, wherein said gate-removed part has a cylindrical surface.

3. The optical lens according to claim 1, wherein said gate-removed part has a conical surface.

4. The optical lens according to claim 1, wherein said plastic is a polymethyl methacrylate resin.

* * * * *